United States Patent Office 2,850,485
Patented Sept. 2, 1958

2,850,485

POLYMERIC TRIAZOLE COMPOSITIONS USEFUL AS COLD DRAWN FIBERS OR SHAPED ARTICLES

Gaetano F. D'Alelio, Pittsburgh, Pa., assignor to Koppers Company, Inc., a corporation of Delaware No Drawing. Continuation of application Serial No. 244,697, August 31, 1951. This application June 26, 1953, Serial No. 364,506

15 Claims. (Cl. 260—80.5)

This invention relates to new monomers and to new polymeric materials derived therefrom and is particularly directed to the polymerization products obtained by polymerizing a mass comprising as a new monomer an amide of acrylic or methacrylic acid and a diamino-1,2,4-triazole in the presence or absence of other ethylenic copolymerizable compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as, films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that improvements in dyeing properties of acrylonitrile polymers are obtained by the polymerization of polymerizable masses comprising acrylonitrile and an amide of acrylic or methacrylic acid and a diamino-1,2,4-triazole with or without other copolymerizable ethylenic compounds. It has been found further that in addition to the fact that amides of acrylic or methacrylic acid and diamino-1,2,4-triazoles yield particularly valuable copolymers with acrylonitrile, they may also be used effectively to form copolymers with other types of copolymerizable ethylenic compounds. It has been found still further that the amides of acrylic or methacrylic acid and diamino-1,2,4-triazoles can be polymerized per se to form useful polymers. Thus it has been found that valuable polymerization products may be prepared in accordance with the invention by polymerizing a mass comprising an amide of acrylic or methacrylic acid and a diamino-1,2,4-triazole either in the presence or absence of other ethylenic copolymerizable compounds such as acrylonitrile and the other copolymerizable ethylenic compounds listed hereinafter.

The amides of acrylic or methacrylic acid and a diamino-1,2,4-triazole are prepared readily by acylating guanazole (3,5-diamino-1,2,4-triazole) or a guanazole derivative with acrylic or methacryl acid or the anhydride or acid chloride of these acids. As guanazole is a difunctional base, both the mono- and the diacyl derivative can be readily prepared but the latter is advantageously avoided except where crosslinking is not objectionable. Preferably therefore the acylation is carried out only to the mono stage. If desired one of the basic amino groups may be acylated with some other acyl group such as formyl or acetyl or like alkanoyl group. For example, the mono-guanazolide of acrylic acid (mono-acrylguanazolide) forms readily when guanazole is treated with an equimolar proportion of acryl chloride or acrylic anhydride. Similarly, the mono-guanazolide of methacrylic acid (mono-methacrylguanazolide) is formed from guanazole and methacryl chloride or methacrylic anhydride. The acid chloride and anhydride are sufficiently reactive to form the amide merely upon mixing at room temperature. In some cases where the anhydride or acid chloride are not as reactive or in order to get more complete reaction gentle heating may be advantageous. Guanazole is readily prepared by refluxing an aqueous solution of dicyandiamide and a hydrazine salt, such as, the hydrochloride, and then neutralizing the acid. Other diamino-1,2,4-triazoles (substituted guanazoles) may be prepared in which one or more of the hydrogens are replaced by alkyl, aryl, aralkyl, alkaryl, and cycloaliphatic groups or in which one of the hydrogens is replaced by acyl groups, as listed below, by using substituted hydrazine instead of hydrazine and/or substituted biguanides instead of dicyandiamide and/or by mono-acylating the guanazole with an acid before the acylation with the acrylic acid.

The amides of acrylic or methacrylic acid and diamino-1,2,4-triazoles are represented by the general formula:

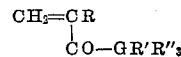

in which R is hydrogen or the methyl group; G is a diamino-1,2,4-triazole group (guanazole nucleus); R' is the radical R'', or an acyl group; and R'' is hydrogen or an alkyl, aryl, aralkyl, and alkaryl, or cycloaliphatic group. The diamino-1,2,4-triazole group which is the pentavalent guanazole nucleus obtained by removing the five hydrogen atoms from guanazole, has the following formula:

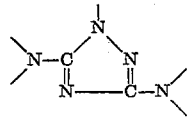

One of these valences is satisfied by the acryl or methacryl group and the others by the R' and R'' groups as defined above. Thus in the amides of this invention one or more of the hydrogen atoms of guanazole other than that replaced by said acryl or methacryl group can be replaced by such groups as methyl, ethyl, isopropyl, n-butyl, sec-butyl, amyl, hexyl, decyl, phenyl, tolyl, xylyl, benzyl, phenethyl, naphthyl, cyclohexyl, cyclopentyl, and the like and one of these hydrogen atoms can be replaced by an acyl group such as acryl, methacryl, acetyl, formyl, propionyl, butyryl, benzoyl, etc. Advantageously, the hydrocarbon substituents should contain not more than a total of four carbon atoms and preferably should not contain more than two carbon atoms each. The acyl substituents preferably are the acyl groups of saturated mono-carboxylic acids (alkanoyl) preferably the formyl and acetyl groups.

As an illustration the acrylic and methacrylic amides of guanazole itself and their polymer units can be represented respectively by the following formulas:

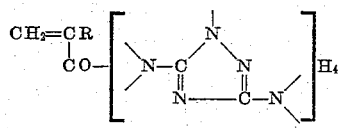

and

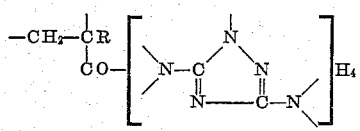

wherein R is hydrogen or methyl.

The proportions of the amide in the polymerization products of the invention may vary over a wide range, that is, from all or substantially all amide down to very small amounts of amide such as may be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is at least about 0.1 percent and increases as the amount of amide is increased. Ordinarily sufficient improvement in dye susceptibility is obtained with amounts of amide ranging up to about 10 or 15 percent but it may be advantageous for reasons such as in the preparation of ion exchange polymers or additives to improve dyeing properties to have a major proportion of amide in the acrylonitrile copolymer. In such cases the concentration of amide may range up to or approaching 100 percent. Within these proportions acrylonitrile copolymers of the invention show great affinity toward many dyes especially acidic, vat, and cellulose acetate dyes.

In addition to the improvements effected in the resulting copolymers, the use of amides of acrylic or methacrylic acid and diamino-1,2,4-triazoles has certain other advantages over the use of the acids. For example, the amides are more soluble in acrylonitrile than the acids. Therefore, it is generally easier to get complete copolymerization of the amide with acrylonitrile in solution, emulsion and suspension polymerizations.

The acrylonitrile copolymers discussed herein are soluble in N,N-dimethyl acetamide (DMA), N,N-dimethyl formamide (DMF), butyrolactone, ethylene carbonate, N,N-dimethyl methyl urethane of the formula $$(CH_3)_2NCOOCH_3$$

ethylene carbamate, N-methyl-2-pyrrolidone, and a number of similar solvents, used alone or in conjunction with N,N-dimethyl cyanamide, N,N-dimethyl cyano-acetamide, N,N-dimethyl methoxy-acetamide, methylene dinitrile, methylene dithiocyanate, formyl caprolactam, formyl morpholine, tetramethylene sulfone, etc. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups of acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

Example I 20.2 grams (0.2 mol) guanazole is admixed with approximately 150 ml. diethyl ether and there is added slowly and with stirring 19.5 grams (0.2 mol) acryl chloride. The mixture is refluxed for approximately ½ hour, cooled, and the ether evaporated. The residue is dissolved in water and shaken with 29 grams (0.125 mol) silver oxide to remove the chloride ion. The mixture is filtered and the filtrate evaporated to dryness. The residue is recrystallized from absolute ethanol. There is obtained mono-acryl guanazolide.

Ultimate analysis for carbon, hydrogen and nitrogen and molecular weight determinations on the product give results which are in close agreement with the theoretical values for mono-acryl guanazolide.

Substitution of equivalent quantities of methacryl chloride and the various diamino-1,2,4-triazoles, as described above, respectively, in the foregoing procedure for the acryl chloride and guanazole there used yields the various mono-acryl and methacryl guanazolides of the present invention.

Example II 31.2 grams (0.2 mol) mono-acryl guanazolide (prepared as in Example I) is admixed with approximately 150 ml. diethyl ether and there is added slowly and with stirring 19.5 grams (0.2 mol) acryl chloride. The mixture is refluxed for approximately ½ hour, cooled, and the ether evaporated. The residue is dissolved in water and shaken with 29 grams (0.125 mol) silver oxide to remove the chloride ion. The mixture is filtered and the filtrate evaporated to dryness. The residue is recrystallized from absolute ethanol. There is obtained di-acryl guanazolide.

Ultimate analyses for carbon, hydrogen and nitrogen and molecular weight determinations on the product give results which are in close agreement with the theoretical values for di-acryl guanazolide.

Substitution of methacryl chloride and the various mono-acryl and mono-methacryl guanazolides of Example I, respectively, in the foregoing procedure for the acryl chloride and mono-acryl guanazolide there used, yields the various di-acryl and dimethacryl guanazolides of the present invention.

Example III

Five polymers of acrylonitrile are prepared from the following monomer compositions:

| Polymer | Acrylonitrile, parts | Mono-acryl guanazolide, parts |
| --- | --- | --- |
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 1.0 part of ammonium persulfate, 0.5 parts of sodium bisulfite, 100 parts of monomer or comonomer mixture is added. The reactor is then flushed with deoxygenated nitrogen and heated with agitation to 50° C. for 24 hours. Steam is introduced into the reactor to remove unpolymerized monomer from the mixture. A small amount of aluminum sulfate is added to the mixture and the polymer isolated by filtration.

The polymer is then washed with water and with methyl alcohol. A portion of the polymer is dissolved in dimethyl formamide, in ethylene carbonate, and in butyrolactone and a film cast from each solution. The film is washed entirely free of solvent and stretched at a ratio of about 8:1 in a glycerine bath containing for each part of film 0.05 part of 1,5-diamino-4,8-dihydroxy-anthraquinone-3-sulfonic acid, 0.03 part sulfuric acid and 50 parts water (50:1 bath-film) ratio at boiling temperature for one hour. The film is then removed and washed with water and scoured for 15 minutes in a 0.4 percent soap solution at 85° C. Whereas the unmodified polyacrylonitrile treated in this manner had little or no color, all of the copolymers were dyed to a deep blue shade.

Fibers are spun from the same solutions either by dry spinning or by wet spinning. The fibers are substantially freed from solvent and dried. After cold-drawing the dried fibers 600-900 percent at 120-145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, butyrolactone, formyl morpholine, etc.

*Example IV*

Five parts of the copolymer fiber C of Example III is dyed to a green shade using the vat color, dimethoxy-di-benzanthrone, at 70° C. in a bath containing 0.5 part of dye, 0.2 part sodium hydroxide, 0.5 part sodium hydrosulfite and 100 parts of water (20:1 bath-fiber ratio). After the first 15 minutes of heating, 0.25 part of Glauber's salt is added. The fiber sample is then oxidized in a 0.5 percent sodium dichromate 1.0 percent acetic acid aqueous solution at 70° C. for 30 minutes in a 20:1 bath-fiber ratio. The dyed fiber is then scoured in a 0.5 percent boiling soap solution. A sample of yarn prepared from the unmodified acrylonitrile polymers and dyed under the same conditions acquired only a light shade of color.

When 1,5-di-p-anisoylamino-4,8-dihydroxyanthraquinone is used as the vat dye, the fiber is dyed a strong violet color.

The procedure of this example and of Example III can be used with the various other amides of acrylic or methacrylic acid and diamino-1,2,4-triazole described above instead of the mono-acryl guanazolide.

*Example V*

The procedure of Example III is repeated for the polymerization of the following monomer compositions:

| Polymer | Acrylonitrile, parts | Vinyl chloride, parts | Mono-acryl guanazolide, parts | Copolymer soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO₂Me. |
| E | 57 | 40 | 3 | NO₂Me. |
| F | 37 | 60 | 3 | Acetone. |

Sometimes copolymers D and E, when dissolved in nitromethane may have gelled, partially dissolved particles known as fisheyes. In such cases, the solubility can be improved by the addition of small amounts of materials which are good solvents for acrylonitrile polymers, such as butyrolactone, ethylene carbonate, dimethyl formamide, dimethyl acetamide, tetramethyl urea, etc. In addition, certain materials which are relatively poor solvents for polyacrylonitrile, such as diethyl formamide, diethyl acetamide, diethyl propionamide, etc., can be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example III.

Instead of mono-acryl guanazolide there may be used the various other amides of acrylic or methacrylic acid and diamino-1,2,4-triazoles described above.

*Example VI*

The procedure of Example III is repeated for the polymerization of the following monomer compositions:

| Polymer | Acrylonitrile, parts | Styrene, parts | Mono-acryl guanazolide, parts |
|---|---|---|---|
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example III. In place of styrene, various styrene derivatives can be used, such as alpha-methyl-styrene; nuclear-substituted chloro-styrenes, i. e., ortho-, meta-, and para-chloro-styrenes, dichloro-styrenes, for example, the 2,3-, 2,4-, 2,5-, 2,6-, 3,4-, and 3,5-dichloro-styrenes, trichloro-styrenes; cyano-styrenes, such as ortho-, meta-, and para-cyano-styrenes, dicyano-styrenes; nuclear-substituted alkyl-styrenes, such as mono- and di-methyl-styrenes, mono- and di-ethyl-styrenes, mono- and di-isopropyl-styrenes; aryl-substituted styrenes, i. e., para-phenyl-styrene, etc., cycloaliphatic-substituted styrenes, such as para-cyclohexyl-styrene; fluoro-styrenes such as ortho-, meta-, para-fluoro-styrene, difluoro-styrenes, etc.; trifluoro-methyl-styrenes, such as ortho-, meta-, and para-trifluoromethyl-styrenes, di(trifluoromethyl)-styrenes, and various other styrenes or mixtures of any number of these with each other or with styrene.

Instead of mono-acryl guanazolide there can be used the various other amides of acrylic or methacrylic acid and diamino-1,2,4-triazoles described above.

*Example VII*

The procedure of Example III is repeated for the polymerization of the following monomer compositions:

| Polymer | Acrylonitrile, parts | Vinylidene chloride, parts | Mono-methacryl guanazolide, parts | Copolymer soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 percent in the polymer molecules, only the same active solvents, such as butyrolactone, ethylene carbonate, N,N-dimethyl acetamide, N,N-dimethyl formamide, etc., can be used as solvents. The above copolymers dye readily and thoroughly than similar copolymers containing no guanazolide.

*Example VIII*

The procedure of Example III is repeated for the polymerization of the following monomer compositions:

| Polymer | Acrylonitrile, parts | Vinylidene chloride, parts | Vinyl chloride, parts | Mono-amide of guanazole and acrylic acid, parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example III.

Instead of mono-acryl guanazolide there can be used the various other amides of acrylic or methacrylic acid and diamino-1,2,4-triazoles described above.

Instead of copolymerizing the amides of this invention with acrylonitrile, they may be polymerized independently to produce polymeric amides of acrylic or methacrylic acid and diamino-1,2,4-triazoles and the prepared homo-polymer used to modify polyacrylonitrile or acrylonitrile copolymers. The acrylonitrile polymers may be blended with up to 10 percent or more of the homo-polymer without serious loss in the physical or chemical properties of the resulting dyed structures. The following example is illustrative.

*Example IX*

Polymeric mono-acryl guanazolide is prepared substantially in accordance with the procedure of Example III. A 10 percent solution of this homo-polymer is prepared in dimethyl formamide and added to a dimethyl formamide solution of polyacrylonitrile containing 20 percent polymer so that a composition containing 90 parts of polyacrylonitrile and 10 parts of the polymeric mono-acryl guanazolide is obtained. The solution is heated to 130° C. after which the solution is filtered. Films and fibers prepared from this mixture are dyed in accordance with the process of Example III and satisfactory, dyed, shaped articles are obtained. The unmodified polyacrylonitrile without the addition of the polymeric mono-acryl guanazolide shows little or no dye retention.

Instead of using a homopolymer of the mono-acryl guanazolide copolymers such as polymers D and E of Example III can be used as modifiers for the unmodified homopolymers of acrylonitrile. For example, polymer E of Example III which consists of 80 parts of acrylonitrile and 20 parts of the mono-acryl guanazolide has excellent compatibility with homopolymers of acrylonitrile and has less detrimental effect on the physical properties of the oriented fibers and films. In many cases it is desirable to use amide-acrylonitrile copolymers which have even a higher ratio of the amide as, for example, 50 to 70 parts of the amide copolymerized with acrylonitrile or methacrylonitrile. In other cases the copolymers of amide with other monomers are satisfactory such as, for example, copolymers of styrene, vinyl chloride, vinylidene chloride, alpha-methyl-styrene, etc.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing at least one structural unit present in the acrylonitrile copolymer. Thus as there are present in the acrylonitrile copolymer, structural units derived from the acrylonitrile and styrene, it is desirable to have present in the modifying copolymer structural units derived from styrene and/or acrylonitrile, advantageously both, in addition to those derived from the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the present invention have in the polymer molecule a plurality of repeating units of the formula

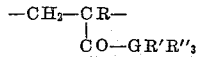

in which R, R', R", and G are as indicated above and when the amide is copolymerized with acrylonitrile will contain additional repeating units of the formula

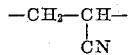

In addition, the polymerization products can contain any number of repeating units of the type obtained by the copolymerization of an amide of acrylic or methacrylic acid and a diamino-1,2,4-triazole or a mixture of acrylonitrile and the amide with one or more copolymerizable ethylenic compounds, such as, for example, vinylidene chloride, vinyl chloride, styrene, alpha-methyl-styrene, methacrylonitrile, fumaronitrile, beta-cyano-acrylamide and methyl beta-cyano-acrylate.

As previously indicated, the solvent resistance of copolymers that contain one or more monomer units in addition to those formed by the acrylonitrile and the amides of the invention is affected by the type and proportion of copolymerizing monomer or monomers used to replace part of the acrylonitrile. For example, copolymers containing small amounts of the amide units can contain various proportions of such monomer units as obtained from vinylidene chloride, methacrylonitrile, fumaronitrile, and beta-cyano-acrylamide without considerable reduction in solvent resistance.

Replacement of acrylonitrile units in the copolymers by vinyl chloride, styrene and alpha-methyl-styrene units results in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-amide type copolymer will decrease much more when one or more monomers having relatively weak secondary bonding forces, such as styrene or ethylene is used to replace part of the acrylonitrile than when one or more monomers having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which can also be present in the polymerizable masses for copolymerization with amides of acrylic or methacrylic acid and diamino-1,2,4-triazoles, with or without acrylonitrile, include one or more of the following: acrylates, e. g. methyl acrylate; methacrylates, e. g. methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and substituted styrenes as listed in Example VI, etc.

The polymerization products of this invention can be prepared by various polymerization systems, such as emulsion, suspension, mass and solution polymerizations. In addition to the monomers, the polymerizable mass may also contain other materials such as catalysts, e. g. peroxides, such as benzoyl peroxide, naphthyl peroxides, phthalyl peroxide, tertiary-butyl hydro-peroxide, hydrogen peroxide, cyclohexyl hydro-peroxide, tertiary-butyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence or polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., may be used as a precipitating bath for N,N-dimethyl acetamide, N,N,N',N'-tetramethyl urea, butyrolactone, ethylene carbonate, and other solvent compositions of these copolymers. The extruded fibers, from which substantially all of the solvent has been removed in the spinning step, about 1–10 percent remaining in the shaped article, can then be cold-drawn about 100–900 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent of amide in the copolymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and an amide according to the invention, the proportion of acrylonitrile in the copolymers can be much less than 85 percent without destroying the capacity for molecular orientation. Molecularly oriented, cold-drawn, shaped articles of particular usefulness are prepared from copolymer compositions containing in the polymer molecules 60–99.9 percent acrylonitrile, 0.1–15 percent advantageously 0.1–5 percent the amide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer molecule in amounts of one percent or more.

The polymerization products of this invention show great affinity for the acetate, acidic and vat dyes. The cellulose acetate dyes which are effective with these polymerization products are mainly amino anthraquinone derivatives. A number of other acidic dyes that can be used are anthranilic acid→1-(4'-sulfophenyl)-3-methyl-5-pyrazolone; 1,5-diamino-4,8-dihydroxy - anthraquinone-3-sulfonic acid; 1-amino-naphthalene-4-sulfonic acid→alpha-naphthol-4-sulfonic acid; the sodium salt of sulfanilic acid→aniline→2-benzoyl - amino-5-naphthol-7-sulfonic acid; the sodium salt of 4,4'-diamino-stilbene-2,2'-di-sulfonic acid ⇌ (phenol)$_2$ ethylated; 1,5-diamino-4,8-dihydroxy-anthraquinone-3-sulfonic acid; dye prepared by diazotizing 1-amino-naphthalene-4-sulfonic acid and coupled with alpha-naphthol-4-sulfonic acid; the sodium salt of (m-amino-benzoic acid→o-anisidine) phosgenated; the sodium salt of (2-naphthol-6,8-disulfonic acid←benzidine →phenol) ethylated; dimethoxy-dibenzanthrone; and 1,5-di-p-anisoylamino-4,8-dihydroxy-anthraquinone.

From the molecularly orientable copolymers of this invention fibers can be prepared having improved dyeing properties, low shrinkage in boiling water, sometimes as low 3 to 5 percent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

This application is a continuation of my presently co-pending application Serial No. 244,697, filed August 31, 1951 now abandoned.

What is claimed is:

1. As a new monomeric composition, the mono-amide of guanazole and acrylic acid.

2. As a new monomeric composition the mono-amide of guanazole and methacrylic acid.

3. A homopolymeric composition of the monomeric composition of claim 1.

4. As a new monomeric composition a member selected from the group consisting of mono-amide of diamino-1,2,4-triazole and acrylic acid and the mono-amide of diamino-1,2,4-triazole and methacrylic acid.

5. A homopolymeric composition of the monomeric composition of claim 4.

6. A copolymer of a polymerizable amide as defined in claim 1 and a polymerizable monomer having a $$CH_2=C<$$

group.

7. A copolymer of a mono-amide selected from the group consisting of the mono-amide of guanazole and acrylic acid and guanazole and methacrylic acid and a polymerizable monomer selected from the group consisting of acrylonitrile, vinyl chloride, vinylidene chloride, styrene, alpha-methyl-styrene, methacrylonitrile, fumaronitrile, beta-cyano-acrylamide, and methyl beta-cyano-acrylate.

8. A cold-drawn shaped article having molecular orientation and dye susceptibility to acid dyes, said article comprising a copolymer of acrylonitrile and an amide as defined in claim 1.

9. A cold-drawn fiber having molecular orientation and dye susceptibility to acid dyes, said fiber comprising a copolymer of acrylonitrile and the mono-amide of guanazole and acrylic acid, said copolymer having a molecular weight of at least about 10,000 and containing in the polymer molecule no more than about 15 percent by weight of said amide.

10. A cold-drawn fiber having molecular orientation and dye susceptibility to acid dyes, said fiber comprising a copolymer of about 60–98.9 percent by weight acrylonitrile, about 0.1 to 5 percent by weight of a member selected from the group consisting of the mono-amide of guanazole and acrylic acid and the mono-amide of guanazole and methacrylic acid, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl beta-cyano-acrylate.

11. A cold-drawn fiber having molecular orientation and dye susceptibility to acid dyes, said fiber comprising a copolymer of about 60–98.9 percent by weight acrylonitrile, about 0.1 to 5 percent by weight of a member selected from the group consisting of the mono-amide of guanazole and acrylic acid and the mono-amide of guanazole and methacrylic acid, and about 1 to 39.9 percent by weight vinylidene chloride.

12. A cold-drawn fiber having molecular orientation and dye susceptibility to acid dyes, said fiber comprising a copolymer of about 60–98.9 percent by weight acrylonitrile, about 0.1 to 5 percent by weight of a member selected from the group consisting of the mono-amide of guanazole and acrylic acid and the mono-amide of guanazole and methacrylic acid, and about 1 to 39.9 percent by weight vinyl chloride.

13. A cold-drawn fiber having molecular orientation and dye susceptibility to acid dyes, said fiber comprising a copolymer of about 60–98.9 percent by weight acrylonitrile, about 0.1 to 5 percent by weight of a member selected from the group consisting of the mono-amide of guanazole and acrylic acid and the mono-amide of guanazole and methacrylic acid, and about 1 to 39.9 percent by weight styrene.

14. A cold-drawn fiber having molecular orientation and dye susceptibility to acid dyes, said fiber comprising a copolymer of about 60–98.9 percent by weight acrylonitrile, about 0.1 to 5 percent by weight an amide as defined in claim 1.

15. A cold-drawn shaped article having molecular orientation and dye susceptibility to acid dyes, said article comprising a copolymer of about 60–98.9 percent by weight acrylonitrile, about 0.1 to 5 percent by weight of an amide as defined in claim 1.

References Cited in the file of this patent

UNITED STATES PATENTS

| | | |
|---|---|---|
| 2,320,850 | D'Alelio | June 1, 1943 |
| 2,395,776 | Bavley | Feb. 26, 1946 |
| 2,567,836 | Anthes | Sept. 11, 1951 |

FOREIGN PATENTS

| | | |
|---|---|---|
| 468,044 | Canada | Sept. 12, 1950 |